Oct. 30, 1934.  A. KIPNIS  1,978,430
FLANGE FORMING MACHINE
Filed Nov. 11, 1930  5 Sheets-Sheet 1
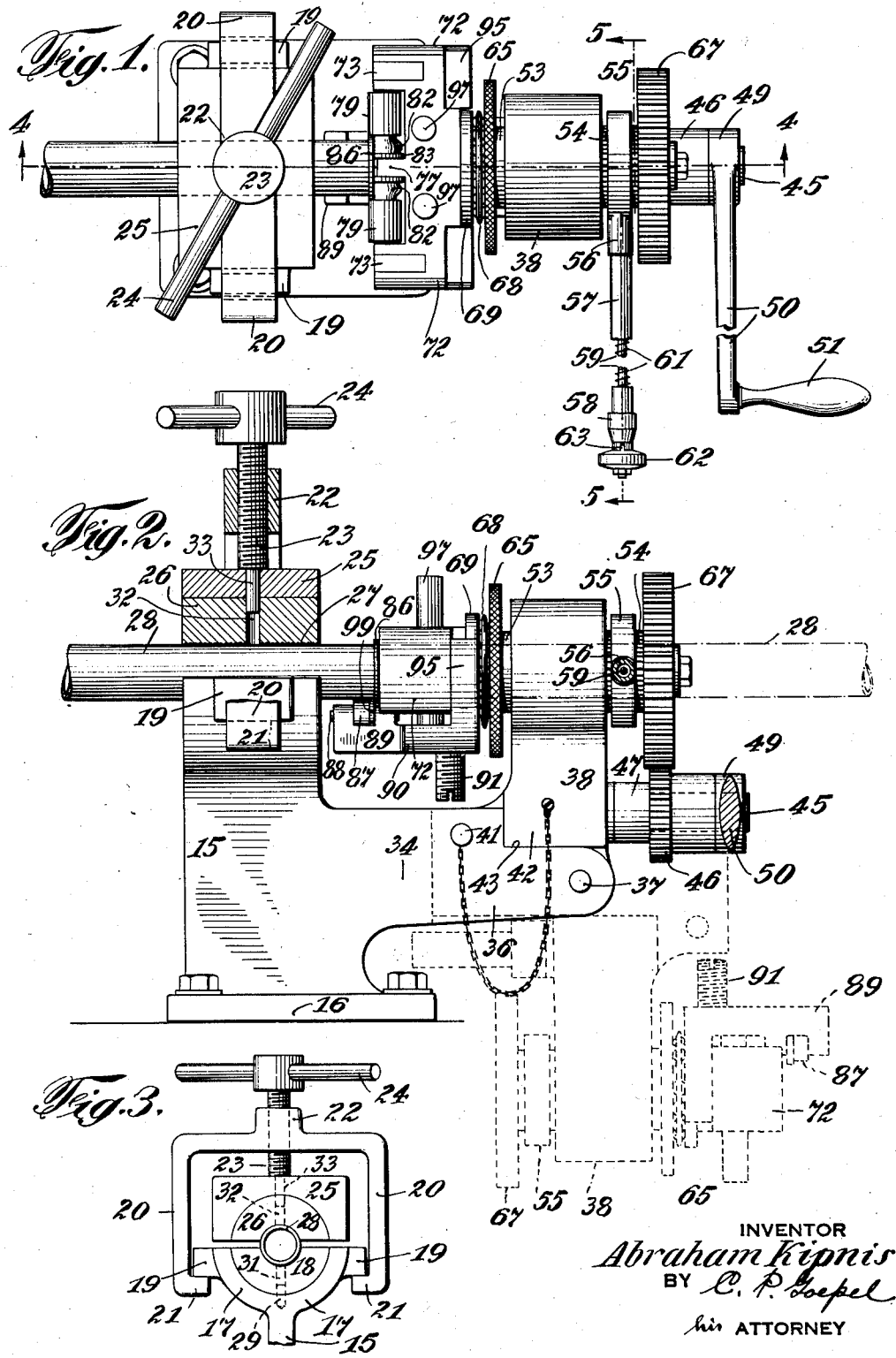
INVENTOR
Abraham Kipnis
BY C. P. Goepel
his ATTORNEY

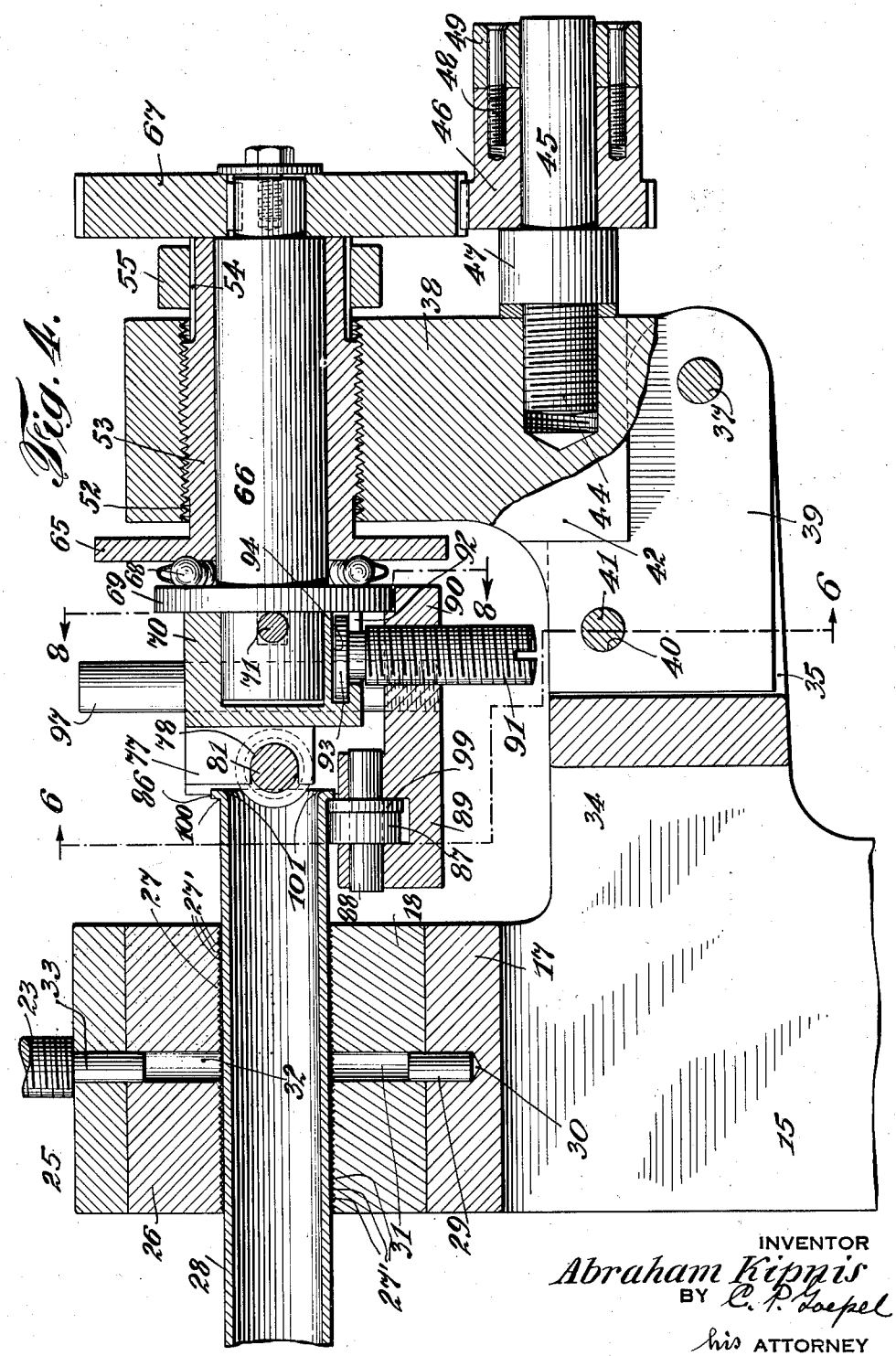

Oct. 30, 1934. A. KIPNIS 1,978,430
FLANGE FORMING MACHINE
Filed Nov. 11, 1930 5 Sheets-Sheet 3
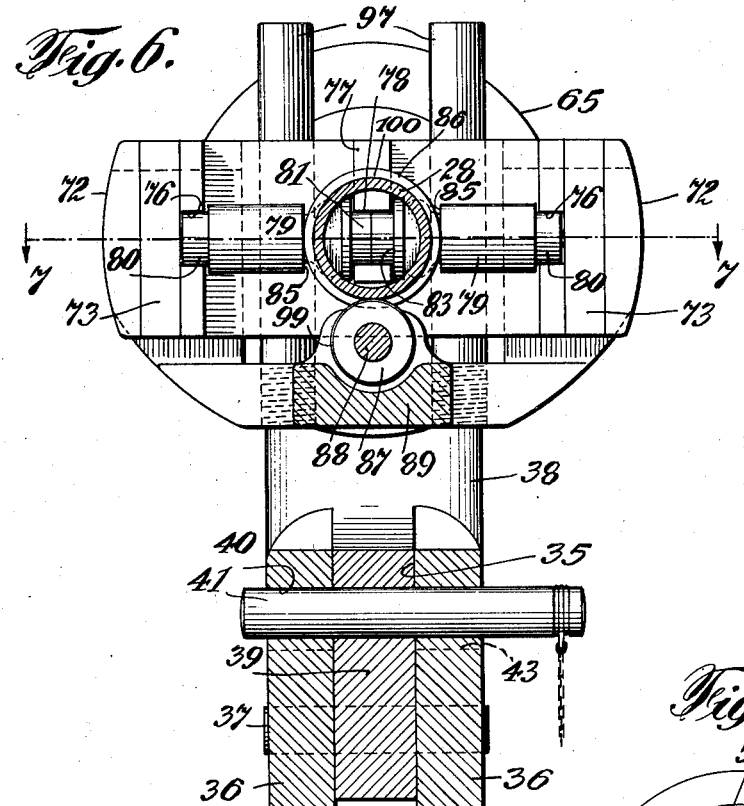
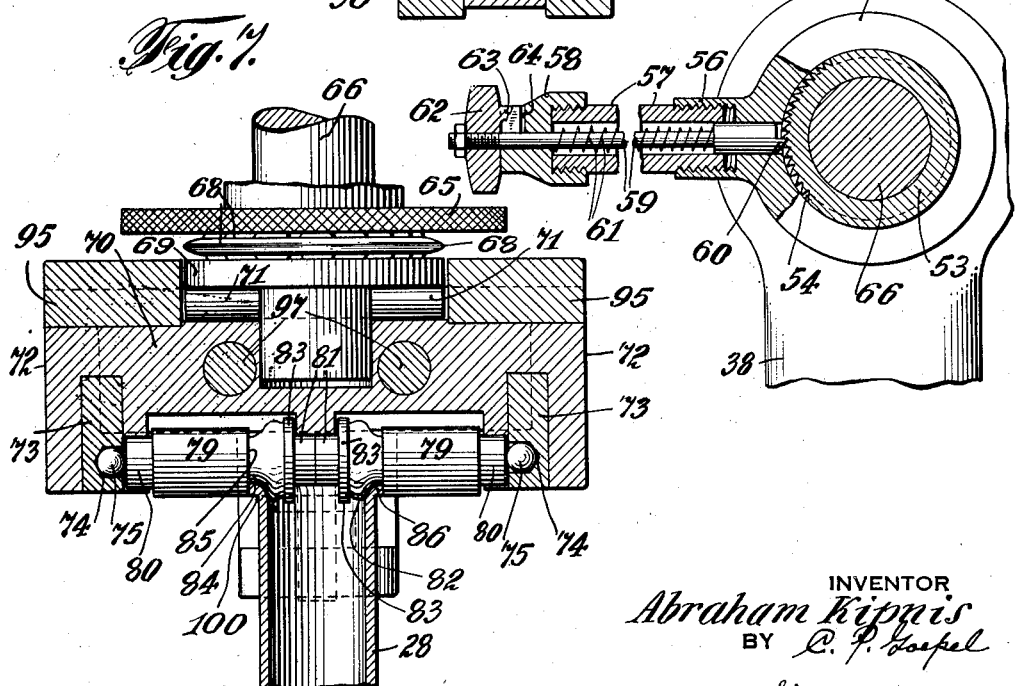
INVENTOR
Abraham Kipnis
BY
his ATTORNEY Oct. 30, 1934.   A. KIPNIS   1,978,430
FLANGE FORMING MACHINE
Filed Nov. 11, 1930   5 Sheets-Sheet 4
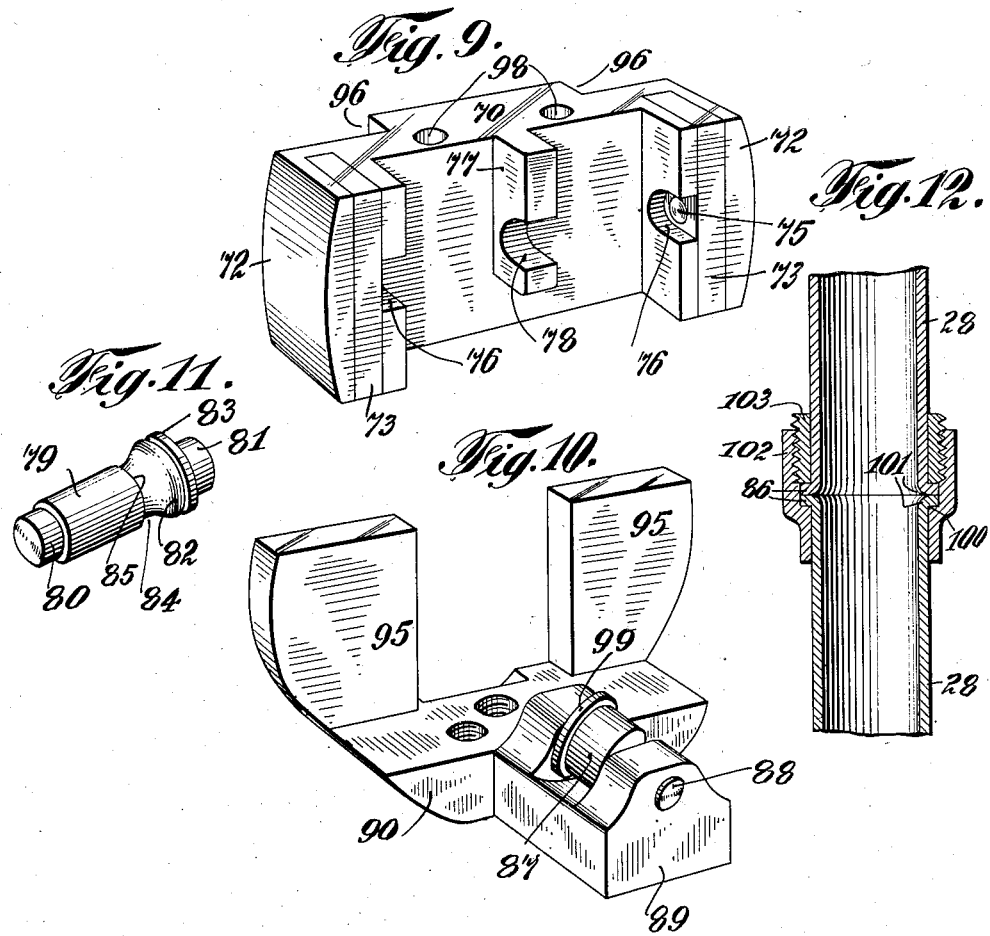
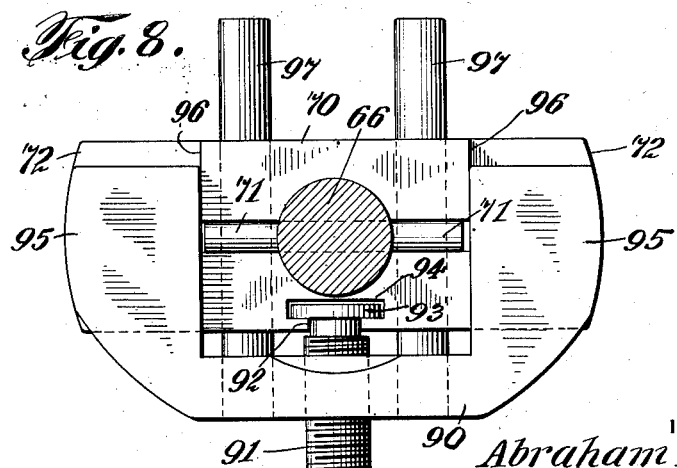
INVENTOR
Abraham Kipnis
BY
his ATTORNEY Oct. 30, 1934.   A. KIPNIS   1,978,430
FLANGE FORMING MACHINE
Filed Nov. 11, 1930   5 Sheets-Sheet 5
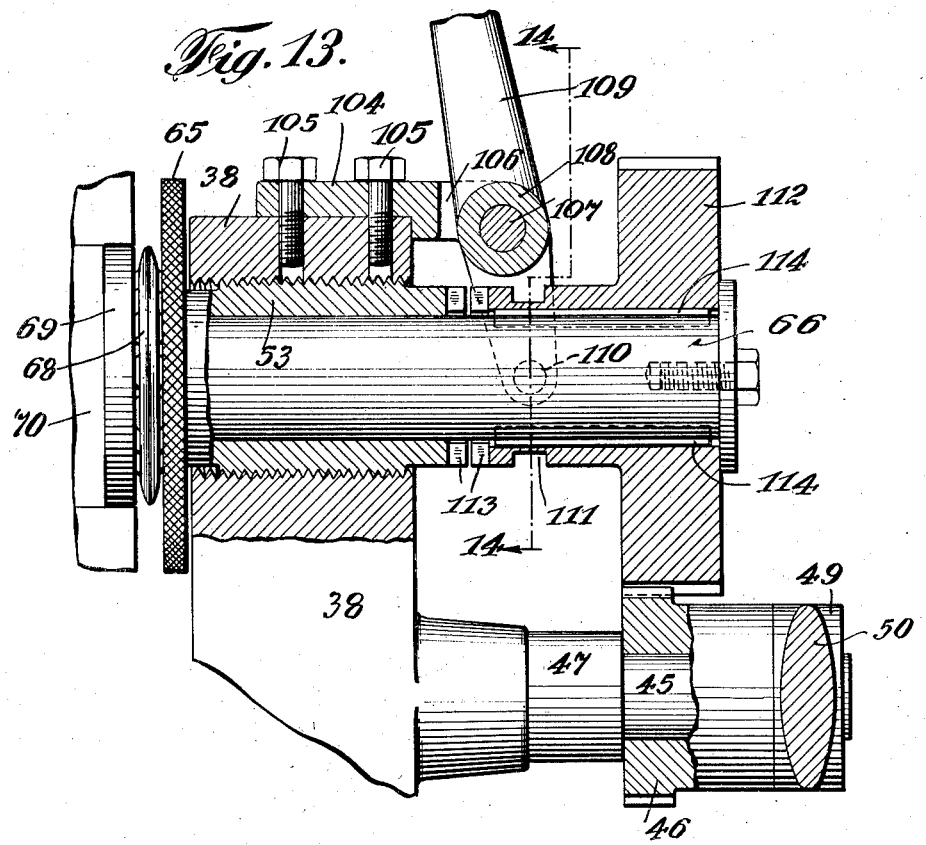
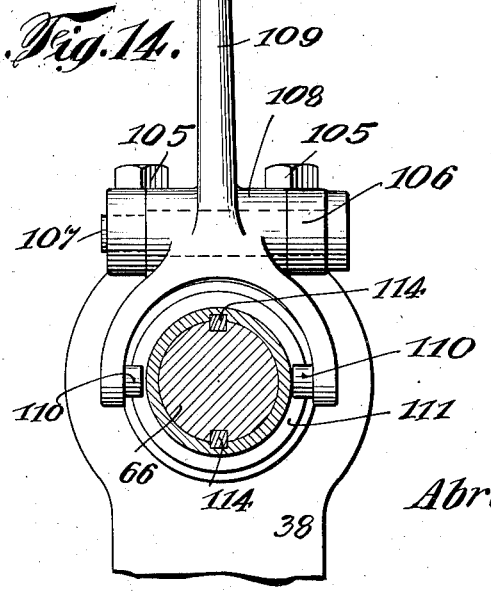
INVENTOR
Abraham Kipnis
BY C. P. Goepel
his ATTORNEY Patented Oct. 30, 1934

1,978,430

UNITED STATES PATENT OFFICE 1,978,430

FLANGE FORMING MACHINE

Abraham Kipnis, Far Rockaway, N. Y., assignor to R-K Products, Inc., New York, N. Y., a corporation of New York Application November 11, 1930, Serial No. 494,835

16 Claims. (Cl. 153—81)

This invention relates to a flange forming machine, its object being to provide an improved machine of this character for producing flanges or beads on thin-walled pipes or conduits of the type used in buildings to encase electrical conductors for lighting systems, telephones, radio sets, etc.

An object of the invention is to provide a simple, practical and efficient flange forming machine of relatively small size, capable of being moved from place to place for use in the building or at the place where the pipes or conduits are to be installed.

Another object of the invention is to provide a machine embodying features of adjustability and constructed to permit interchangeability of certain of its parts and tools in order that the machine can be utilized to form flanges or beads upon pipes differing in size.

Another object of the invention is to provide a machine which will form the flanges quickly and in a true and accurate manner, and one which can be operated by hand. The machine of the present invention can be successfully operated by unskilled labor.

A still further object is to provide a machine in which the pipe holding mechanism may be utilized to hold a pipe length not only during the flange forming operation, but also when it is desired to sever the length into smaller pieces. To this end certain of the mechanisms are mounted for relative displacement, so as to clear, at will, the way or path for the pipe-cutting operations. In this regard, therefore, the machine has a dual character.

It is further within the province of this invention to provide, in a machine comprehending the foregoing features, a construction in which different sizes of pipe-holding, and flange-forming tools may be used. By this provision, the machine can be used with equal facility for operating upon pipes differing in cross dimensions.

Other objects and aspects of the invention will appear hereinafter.

The invention consists in the improved flange-forming machine, and in the form, construction and relative arrangement of its parts, as will be hereinafter more fully set forth and claimed.

Two simple and practical embodiments of the invention, as reduced to practice, are shown in the accompanying drawings, in which:—

Figure 1 represents a top plan view of a machine constructed in accordance with the present invention;

Fig. 2 represents a fragmentary side elevation, with parts in section, this view also showing in dash outline certain of the mechanisms in downwardly displaced positions where they clear the way for the utilization of the machine in cutting pipe lengths;

Fig. 3 represents a front elevation of the pipe holding mechanism including the removable pipe-holding tool parts;

Fig. 4 is a vertical longitudinal section through the machine, this view being on a larger scale and taken on the line 4—4 of Fig. 1;

Fig. 5 represents an enlarged detail section of the ratchet feed mechanism, this view being taken on the line 5—5 of Fig. 1;

Fig. 6 is a cross section through the machine taken on the line 6—6 of Fig. 4;

Fig. 7 represents a vertical section taken on the line 7—7 of Fig. 6 and showing how the forming tools operate upon the end of a pipe to produce an annular flange thereon;

Fig. 8 represents a cross section taken on the line 8—8 of Fig. 4;

Fig. 9 represents a detail perspective view on the frame and bearing structures for the detachable flange forming tools;

Fig. 10 is a detail perspective view of the frame and holder structure for the anvil roller;

Fig. 11 is a perspective view of one of the detachable flange forming tools;

Fig. 12 represents a longitudinal section through connected pipes or conduits formed with flanges of the kind produced by the present machine;

Fig. 13 is an elevation and section showing a modified construction whereby to effect the operation of the feed bearing for controlling the pressure of the flange forming tools against the flange under formation; and Fig. 14 is a cross section taken on the line 14—14 of Fig. 13.

The preferred form of construction, as illustrated in the accompanying drawings, comprises a pedestal 15 having a base 16 adapted to be bolted upon a bench or other suitable support; and the pedestal at its upper end is formed with upwardly curving arms 17—17 (Fig. 3) to provide a semi-circular seat for a lower pipe holding section 18. The arms 17 are formed or provided at their upper ends with outwardly projecting catch lugs 19. 20 designates a frame of inverted U-shaped form, the arms thereof being provided at their lower ends with inwardly bent portions 21 adapted to engage underneath the catch lugs 19 as shown; and the horizontal top portion of this frame is formed with a boss 22 through which is threaded a screw element 23 to the top portion of which is applied a suitable handle 24 whereby to operate the screw. Within the frame 20, the screw carries a bearing block 25 in which is formed a seat for the upper semi-circular pipe holding section 26. The lower and upper pipe holding sections 18 and 26, complementary of each other, have suitable central semi-circular openings 27 whereby to retain a pipe length as 28 between them, and said openings are toothed as at 27' (Fig. 4) in order to insure a firm grip upon an intervening pipe. Both of said sections 18 and 26 are removable so as to be replaced by other similar sections having toothed seats of a different size for retaining pipes of different cross dimensions. As herein shown, the means for removably mounting the section 18 consists in providing a pin 29 (as best shown in Fig. 4) in a bore 30 in the pedestal 15, the said section 18 having a bore 31 for receiving the upper portion of the pin. The removability of the upper section 26 is obtained by providing a bore 32 therein receptive of a pin 33 formed on the lower end of the screw 23. By this arrangement, it will be manifest that by turning the screw 23 in one direction, for instance, downwardly, the pipe length will be firmly gripped between the sections 18 and 26, while upon turning the screw so as to advance it in an upward direction the pipe will be released, and as well the said sections 26 and 18 will be free for removal if it is desired to replace them by other similar sections.

The pedestal 15 is formed with a rearwardly projecting arm 34, bifurcated at 35 to provide branches 36, 36 between which is swingably mounted upon a fulcrum pin 37 a bracket body 38 having between said branches 36 a forwardly projecting arm 39 holed at 40 to receive a locking pin 41 which is removably inserted in suitably aligned transverse apertures in the said branches 36, 36. The bracket body 38 is represented as provided with angular portions 42 adapted to seat in corresponding notches 43 in the branches 36 when said body is in upright position as shown in Figs. 2 and 4 for receiving the locking pin 41. As illustrated in Fig. 2 in dash outline, the bracket body (as well as all the parts carried thereby) may, upon the removal of the locking pin 41, be swung upon the fulcrum pin 37 so as to depend therefrom and thereby provide a clear space or path above the arm 34 for the projection of a pipe length held in the sections 18 and 26 for severing operations.

Threaded at 44 into the bracket body 38 and projecting rearwardly therefrom is a stud shaft 45 on which is mounted a pinion 46, there being a suitable collar 47 upon the stud shaft between the bracket body and pinion for holding the latter operatively in place. To the hub of the pinion is secured by means of screws 48 the hub 49 of a crank arm 50 carrying a suitable handle 51. In the top portion of the bracket body is provided a screw threaded opening 52 wherein is threaded a feed bearing or sleeve 53, the rear portion of which beyond the bracket body is provided with ratchet teeth 54. Surrounding the ratchet teeth is a ring 55 having an outwardly projecting portion 56 into which is threaded a tubular member 57 which is furnished at its outer end with a head portion 58. As best shown in Fig. 5 a rod 59 extends centrally and inwardly through the parts 58, 57 and 56, and is provided with a tooth 60 adapted to engage the ratchet teeth. A spring 61 coiled about the rod within the tubular member 57 serves as means for normally urging the rod into that position in which the tooth 60 will engage with the ratchet teeth. The outer end of the rod 59 carries a pull knob 62 furnished with a lug 63 normally engaged in a notch 64 in the head 58. Under this arrangement, by pulling the knob outwardly, the rod 59 will be pulled outwardly against the tension of the spring so as to withdraw the tooth 60 from the ratchet teeth, the lug 63 being adapted in this instance to engage the outer end of the head 58 so as to hold the pin in its outward position with its tooth disconnected from the ratchet teeth. When the pin is in its inward position as shown in Fig. 5 with its tooth engaged with the ratchet teeth, the feed bearing can be advanced forwardly by turning the ring around the ratchet teeth in a direction towards the right as viewed in Fig. 5. In front of the bracket body, the feed bearing 53 is provided with a disc 65 by the manual operation of which the feed bearing may be moved reversely, the tooth 60 during the reverse operation sliding over the ratchet teeth owing to the fact that the rod may readily slip outwardly under the yielding of the spring 61.

The feed bearing 53 has a central longitudinal bore therethrough wherein is mounted for rotation a shaft or spindle 66 on the rear end of which is fixed a spur gear 67 which is in mesh with the pinion 46. By this arrangement, operation of the crank will result in the rotation of the shaft 66. An anti-friction ball bearing thrust structure 68 is provided between the disc 65 and a disc 69 carried by the shaft 66, this arrangement being such that the shaft 66 and the feed bearing 53 may be operated independently of each other. In front of the disc 69 a head 70 is secured by a pin 71 to the shaft 66. This head 70, as clearly shown in Fig. 9, is provided at its opposite ends with forwardly projecting portions 72 carrying vertical bearing plates 73. Each of the bearing plates 73 has a seat 74 therein (Fig. 7) containing a ball member 75; and the inner confronting faces of the portions 72 have open bearings 76 therein exposing the ball members 75, the said bearings 76 and ball members 75 being in axial alignment. Projecting forwardly from the front face of the head 70 at a point midway between the portions 72 is a vertical plate 77 having an open bearing 78 therein which is in alignment with the aforesaid bearings 76. The purpose and object of this construction is to provide a carrier for removably adjoining lengthwise aligned flange forming tools 79. As best represented in Fig. 7, two of the tools 78 can be mounted in adjoining lengthwise relation, said tools having at their outer ends trunnions 80 adapted to seat in the bearings 76 and engage the ball members 75 and having at their inner adjoining ends trunnions 81 adapted to seat in the common midway bearings 78. In this way, the head is mounted to the shaft 66 to rotate therewith and the flange forming tools 79 are mounted in the head to rotate therewith and also to have relative independent rotation.

In construction, each of the tools 79 is formed with a dome-like cam portion 82 adjacent an end guide disc or flange 83, which cam portion recedes into a depression 84 adjacent an annular shoulder 85. The two cam portions 82 of these tools turn within the open end of the pipe length 28 and against the inner surface of the end thereof, so that during the rotation of the head 70 and with the feed bearing 53 properly adjusted, the end portion of the pipe length will be turned outwardly into the depressions 84 and against the annular shoulders 85, it being noted (Fig. 7) that the cam-like portions 82 of the two tools thus operate upon the inner end portion of the pipe at diametrically opposite points. By this means, the end portion of the tube is turned outwardly to produce a flange 86 at right angles to the tube, the periphery of the flange being formed into a transversely straight and smooth symmetrical surface in agreement with the plain faces of the shoulders 85.

To assist in the formation of the flange, I provide a roller anvil 87 rotatable on a pin 88 carried by the horizontal portion 89 of a bridge frame 90 which is supported to the head 70 by means of an adjusting screw 91, screw-threaded through the bridge body (Fig. 8) and having bearing at 92 in the head, the said screw being held against longitudinal movement by means of a head disc 93 which turns in a suitable aperture 94 provided for the purpose in the head. The bridge frame is provided with a pair of spaced upright arms 95 which have sliding fit in suitable vertical notches 96 provided in the rear face of the head. Said bridge frame is also furnished with a pair of upright guide pins 97 which have sliding fit in suitable vertical bores 98 in the head 70. The bridge frame, thus mounted and guided, can be adjusted vertically relatively to the head by manipulating the screw 91. The purpose of this adjustment is to make provision for accurately adjusting the roller anvil 87 to pipes of different cross sectional dimensions. The roller anvil 87, whose axis is at right angles to the common axis of the two tools 79, carries a rim flange 99 which turns against the exterior surface of the pipe length and against the rear face of the flange 86 during the formation of the latter. Said rim flange 99 trues up the rear face of the flange 86 under process of formation, and it serves furthermore, in assisting to form the flange 86 at right angles to the pipe and additionally it causes the production of a sharp annular corner 100, right angular in cross section, between the flange 86 and the pipe. Owing to the formation of the cam portions 82 of the tools 79, the flange 86 is produced with an interior rounded surface 101, so that no projections or protuberances will be left within the pipe line for engagement with the insulation of the wire conductors. In Fig. 12, I show two pipes 28, 28 provided with flanges 86 of the kind produced by the present machine. In this figure also, I show coupling parts 102 and 103 mounted on the pipes and cooperating with the adjoining flanges thereof for coupling the pipes together. These coupling parts are illustrated and described in my copending application Serial No. 494,836, filed November 11, 1930, for Pipe couplings.

The operation of my machine is as follows:—
A pipe as 28 is firmly secured between the sections 18 and 26 and then the feed bearing 53 is advanced until the tools 79 enter the open end of the pipe with the cam portions 82 bearing against the interior end portion of the pipe. The bridge frame is adjusted vertically until the rim flange 99 of the roller anvil 87 will turn upon the exterior surface of the pipe. Thereupon the crank is operated, turning thereby the shaft 66 and head 70 with the result that the forming tools 79 and roller anvil 87 are rotated about a common longitudinal axis for the production of the flange. By operating the ratchet mechanism, the feed bearing 53 is, of course, advanced as may be necessary from time to time in order to cause the tools 79 to exert the necessary force for affecting the production of the flange.

In Figs. 13 and 14 I show a modification in the construction whereby to cause the advancement of the feed bearing 53. In this case a plate 104 is secured by bolts 105 upon the bracket body 38, said plate having spaced rearwardly projecting arms 106 carrying a pin 107. Swingably mounted upon this pin between the arms 106 is a bearing 108 formed transversely upon an operating handle 109. The lower end of this handle has a pin 110 entering an annular channel 111 provided in the hub of the sprocket gear 112. The adjacent ends of the feed bearing 53 and hub of the sprocket gear 112 are respectively toothed as at 113. By moving the handle 109 to the right, as viewed in Fig. 13, the sprocket gear 112 will be moved to the left so that the teeth 113 thereof will be interengaged with the corresponding teeth of the feed bearing 53. The sprocket gear 112 is keyed at 114 upon the shaft 66 for relative sliding movement on the latter. By this arrangement, the feed bearing 53 can be fed forwardly through the operation of the gear 112, it being only necessary in order to effect a forward advance of the feed bearing to manipulate the handle 109 so as to couple the sprocket gear 112 with the feed bearing.

The machine of my present invention is exceedingly simple, composed of few parts, comparatively inexpensive to manufacture and easy to assemble. The machine provides for quick and accurate formation of the flanges upon the pipe lengths. Moreover, when the bracket body is swung downwardly out of the way as illustrated in broken outline in Fig. 2, a free path is provided along the top portion of the machine for the projection of the pipe length within the holder sections 18 and 26 into any position necessary or convenient for severing the pipe length into sections by means of a hacksaw or the like.

From the foregoing description, taken in connection with the accompanying drawings, it will be manifest that I have disclosed a thoroughly satisfactory flange forming machine which embodies the features enumerated in the statement of invention and as well in the foregoing description; and while I have, in the present instance, shown and described two simple embodiments thereof, it is to be understood that the constructions are susceptible of modification in various particulars without departing from the spirit or scope of the invention or sacrificing any of its advantages.

I claim:—

1. A machine of the character described comprising, in combination, an operable shaft and means whereby to operate the same, a frame structure on the shaft and therewith operable, flange forming tools carried by the structure, means for holding a pipe with the end portion thereof in relation to said structure to be operated upon by said tools for producing a flange on the pipe upon the operation of said shaft and structure, said flange forming tools comprising a pair of rollers with cam-like portions for operating on the interior of the pipe end portion to shape the end portion outwardly into flange form, and a roller anvil for operating on the exterior of the pipe to shape the back of the flange.

2. A machine of the character described comprising a base support including means for holding a pipe, a body member on the support carrying an operable shaft and means whereby to operate the same, a frame structure on the shaft carrying tools adapted, on the operation of the shaft, to operate on the pipe and form a flange thereon, said tools comprising a pair of rollers with cam-like portions for operating on the interior of the pipe end portion to shape the end portion outwardly into flange form, and a roller anvil for operating exteriorly of the pipe for shaping the back of the flange.

3. A machine of the character described comprising a base support including means for holding a pipe, a body member on the support carrying an operable shaft and means whereby to operate the same, a frame structure on the shaft carrying tools adapted, on the operation of the shaft, to operate on the pipe and form a flange thereon, said body being pivotally mounted on the base support for swinging movement to move the shaft, operating means, frame structure and tools relatively to the pipe holding means.

4. A machine of the character described comprising a base support including means for holding a pipe, a body member mounted on the support, a feed bearing threaded in the body member for feeding adjustment relatively to the pipe holding means, a shaft rotatably mounted in the feed bearing and provided with a shiftable clutch gear, power means carried by the body member and geared to said shiftable clutch gear whereby to rotate the shaft, operative means adapted to form a connection between the feed bearing and shaft whereby to feed the shaft longitudinally by the feeding movement of the bearing, a frame structure fixed to the shaft and carrying tools adapted to operate on the pipe for forming a flange thereon, and means for moving said shiftable clutch gear into and out of driving engagement with said feed bearing.

5. A machine of the character described comprising a base support including means for holding a pipe, a body member mounted on the support, a feed bearing threaded in the body member for feeding adjustment relatively to the pipe holding means, a shaft rotatably mounted in the feed bearing, means carried by the body member for rotating the shaft and including a driven gear, a thrust bearing between the feed bearing and shaft to enable longitudinal movement of the latter by the former, its construction including a ball-bearing engagement to allow rotation of the shaft independently of the feeding adjustment of the feed bearing, a frame structure fixed to the shaft and carrying tools adapted to operate on the pipe for forming a flange thereon, and means for turning the feed bearing comprising a clutch mechanism for connecting the driven gear with the feed bearing.

6. In a machine of the character described, the combination of a shaft and means for rotating it, a head carried by the shaft, a flange forming roller device mounted on said head and adapted to operate on the interior end portion of a pipe to turn a flange on the pipe, a frame adjustably carried by said head, and a roller anvil carried by said frame and adapted to shape the back of the flange turned on the pipe by said roller device.

7. In a machine of the character described, the combination with means for holding a tube, of means for turning a flange on the end portion of the sustained tube including a shaft supported to have rotary movement and to have longitudinal movement toward and away from the end of the tube, a frame structure on the shaft and therewith movable, flange forming devices carried by the structure and comprising a pair of aligned roller devices having cam-like portions adapted to enter the tube and engage the interior end thereof at opposite points to turn the end portion outwardly into flange form, and a roller anvil carried by the frame to operate exteriorly of the pipe and formed to shape the back of the flange turned outwardly by said roller devices.

8. A machine of the character described comprising means for sustaining a shaft for rotation, means for rotating the shaft, means for feeding the shaft forwardly, a frame structure attached to one end of the shaft and therewith movable, a flange forming roller mounted on the structure for independent operation, its construction including a cam-like portion for turning over the end portion of a pipe and a shoulder for limiting the extent of the turned-over flange, and a roller anvil carried by the frame for independent operation and adapted to operate on the rear face of the turned-over flange, the whole operating for forming and truing a flange on the end portion of a pipe.

9. A machine of the character described comprising means for sustaining a shaft for rotation, means for rotating the shaft, means for feeding the shaft forwardly, a head attached to one end of the shaft and therewith movable, a pair of flange forming rollers mounted on the head for independent operation, each including in its construction a cam-like portion for turning over the end portion of a pipe and a shoulder for limiting the extent of the turned-over flange, the members of said roller pair being reversely positioned with their axes in longitudinal alignment to enable carrying through of the flange forming operation at diametrically opposite points, a frame carried by the head and connected for adjustment relatively thereto, a roller anvil mounted on the frame with its axis at right angle to the axes of the roller pair and adapted to operate on the rear face of the turned-over flange, the whole arranged to operate for turning and truing a flange on the end portion of a pipe.

10. In a machine of the character described, the combination of rotary means, flange forming tools carried thereby, said tools composed of two types of rollers, one for operating on the interior end portion of a pipe for pressing and shaping the same outwardly into a flange, and having a recess with a cam-like side wall portion shaped to direct the end portion of the pipe outwardly into the recess and the recess being of a size to determine the outward extent of the flange, said cam portion being rounded to produce an outwardly rounding surface from the interior of the tube to the front face of the formed flange, and the other type of roller operating upon the exterior surface of the pipe and against the back of the outwardly formed flange and shaped to make the back surface of the outwardly formed flange and exterior surface of the pipe, meet in clean angular relation.

11. In a machine of the character described, the combination with rotary means supported to have advancing and retracting movement, of flange forming tools carried by the rotary means and including a camming roller adapted to operate on the interior end portion of a pipe for pressing and shaping the same outwardly into a flange and an anvil roller adapted to operate between the exterior of the pipe and the back of the outwardly turned flange, said camming roller being formed to determine the outward extent of the flange and to make an outwardly rounding surface from the interior of the tube to the front face of the formed flange, said anvil roller being formed to make the back surface of the outwardly projecting flange and exterior surface of the pipe, meet in clean angular relation.

12. In a machine of the character described, the combination with a base support provided with pipe holding means and having a seat in relation to the pipe holding means, a bracket body pivoted to the base support for movement into and out of said seat, means for securing the bracket body in the seat in fixed relation to the pipe holding means, a rotary shaft carried by the bracket body and means whereby to rotate the shaft, means associated with the bracket body and shaft whereby to feed the latter longitudinally toward the pipe holding means, and operative devices carried by said shaft by means of which, on the rotating movement and feeding actuation of the shaft, to produce a flange on a pipe sustained by the holding means.

13. A machine of the character described, having a carrying element mounted for rotation on its axis, a roller formed with an annular recess, journaled for rotation in said carrying element, one side wall of said recess being shaped to provide a camming tool for forming a flange outwardly on the end portion of a pipe, and the other side wall of said recess being shaped to provide an abutment for the free edge of the outwardly formed flange, and an anvil roller mounted by trunnions on said carrying element in a position to turn upon the exterior surface of the pipe and against the back of the outwardly formed flange and shaped to give the back of the flange a straight form with a true corner between the exterior surface of the pipe and the back surface of the flange.

14. In a machine of the character described, the combination of a shaft mounted to have rotary movement and feeding movement, a hand-operated driving crank and reduction gearing interposed between the crank and shaft for rotating the latter with a minimum of power manually produced, a feed bearing for the shaft, a ball bearing thrust associated with the shaft, to be moved by the feed bearing for controlling the feeding movement of the shaft, flange-forming tools carried by the shaft, effective on the rotary and feeding movements of the shaft to form a flange on the end portion of a pipe, at least one of said tools being operative on the interior end portion of the pipe to turn said end portion outwardly into a flange, and another of said tools being operative on the back portion of the outwardly turned flange to true the same.

15. The combination of a shaft and a manually operated crank controlled reduction gear for operating the shaft, a frame attached to the shaft at one end thereof and therewith rotatable, a set of pipe flanging rollers carried by the frame and each provided with an annular recess for receiving the end of the pipe, the inner side wall of each recess being shaped to provide a camming tool for engaging and turning the pipe end outwardly in the recess, and the outer side wall of each recess forming an abutment to define the free edge of the flange formed in the recess, and means for regulating the pressure of the flanging rollers upon the work.

16. In a machine for forming a flange on a pipe, a pair of flange forming rollers disposed to operate simultaneously on the interior end portion of a pipe and at opposite points thereon, the individual rollers having annular camming portions for turning the end portion of the pipe outwardly into a flange, and having annular abutment portions for engagement by the free edge of the outwardly forming flange to determine the outward extent of the formed flange, and a third roller deposed to turn on the circumference of the pipe and against the outwardly forming flange to true the flange with respect to the circumference of the pipe.

ABRAHAM KIPNIS.